(12) United States Patent
Thomas

(10) Patent No.: US 7,159,941 B2
(45) Date of Patent: Jan. 9, 2007

(54) VEHICULAR CHILD SEAT ASSEMBLY

(76) Inventor: Rodney Edward Thomas, 4740 Highway 51, Building 5, Apt. 206, Southaven, MS (US) 38671

( * ) Notice: Subject to any disclaimer, the term of this patent is extended or adjusted under 35 U.S.C. 154(b) by 0 days.

(21) Appl. No.: 10/751,078

(22) Filed: Jan. 2, 2004

(65) Prior Publication Data

US 2005/0146182 A1 Jul. 7, 2005

(51) Int. Cl.
*B60N 2/30* (2006.01)
(52) U.S. Cl. .................. 297/255; 297/238; 297/112
(58) Field of Classification Search .............. 297/238, 297/254, 255, 250.1, 112
See application file for complete search history.

(56) References Cited

U.S. PATENT DOCUMENTS

| | | | | |
|---|---|---|---|---|
| 1,985,048 A | * | 7/1934 | Morris | 297/238 |
| 2,584,481 A | * | 2/1952 | Mast et al. | 297/115 |
| 2,634,794 A | * | 4/1953 | Young | 297/183.5 |
| 2,966,201 A | * | 12/1960 | Strahler | 297/238 |
| 3,669,492 A | * | 6/1972 | Peterson | 297/253 |
| 3,951,448 A | * | 4/1976 | Hawie | 297/113 |
| 4,540,216 A | | 9/1985 | Hassel, Sr. | |
| 4,555,135 A | * | 11/1985 | Freeland | 297/105 |
| 4,756,573 A | * | 7/1988 | Simin et al. | 297/250.1 |
| 4,900,087 A | * | 2/1990 | Crisp | 297/238 |
| 4,913,498 A | | 4/1990 | Forlivio | |
| 4,936,627 A | | 6/1990 | Guim | |
| 4,986,600 A | | 1/1991 | Leblanc et al. | |
| 5,205,608 A | | 4/1993 | Stig | |
| 5,384,946 A | | 1/1995 | Sundstedt et al. | |
| 5,516,194 A | * | 5/1996 | Maule | 297/284.1 |
| 5,568,959 A | | 10/1996 | Weber et al. | |
| 5,722,724 A | * | 3/1998 | Takei et al. | 297/238 |
| 5,749,599 A | * | 5/1998 | Gardner | 280/748 |
| 6,494,531 B1 | | 12/2002 | Kim | |
| 6,572,189 B1 | * | 6/2003 | Blaymore | 297/256.12 |
| 6,769,735 B1 | * | 8/2004 | Winkler | 297/112 |

FOREIGN PATENT DOCUMENTS

GB 2232582 A * 12/1990

* cited by examiner

*Primary Examiner*—Peter M. Cuomo
*Assistant Examiner*—Joseph Edell
(74) *Attorney, Agent, or Firm*—Wyatt, Tarrant & Combs, LLP

(57) ABSTRACT

The present invention relates to a child seat assembly that may be characterized, at least in one embodiment, as being substantially integral with a seat of a motor vehicle. This child seat assembly is at least generally capable of being disposed in first, second, third, and fourth positions to enable the seat of the motor vehicle to be configured to appropriately accommodate an infant, a toddler, a child (as in a booster seat), or an adult.

10 Claims, 8 Drawing Sheets

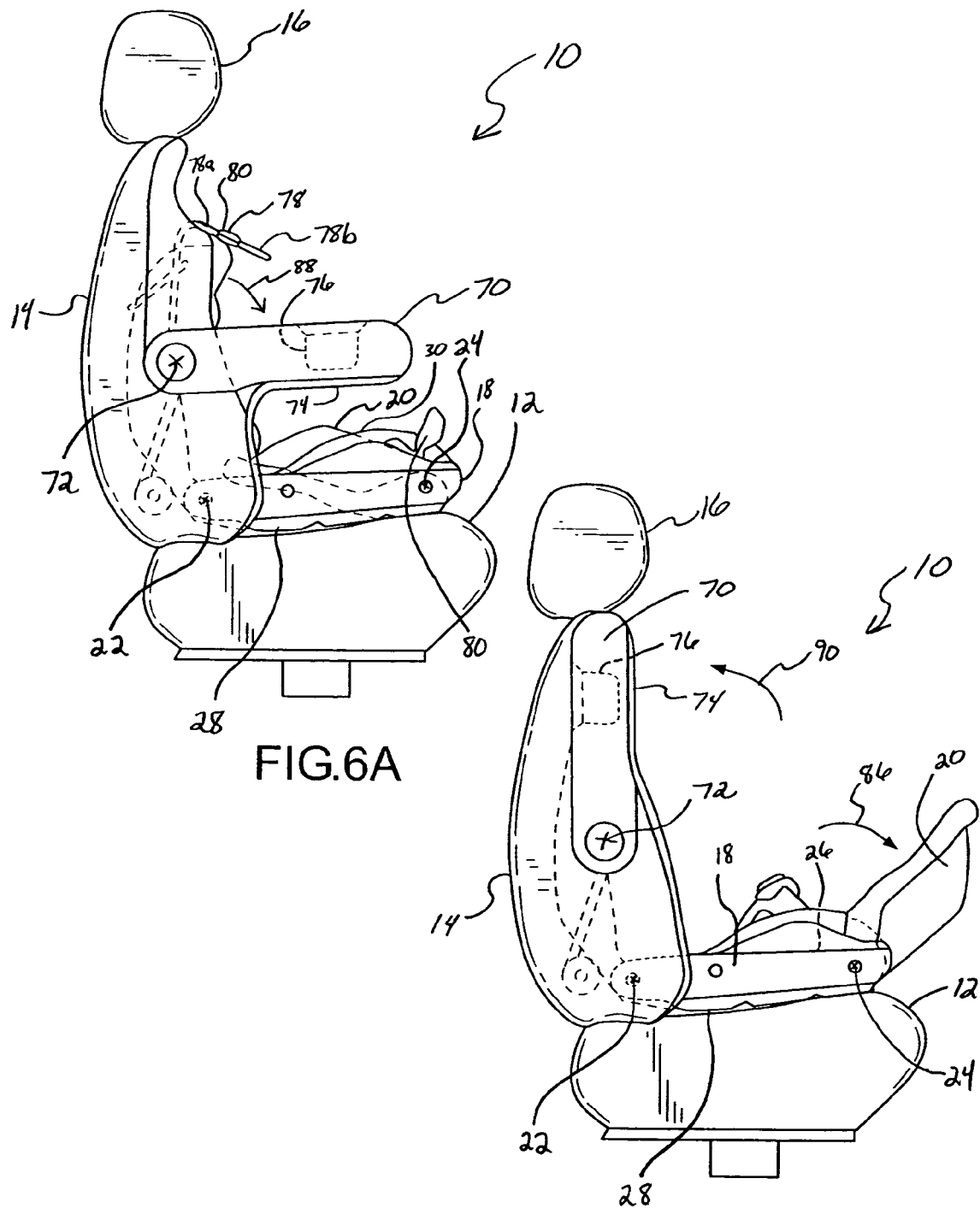

VEHICULAR CHILD SEAT ASSEMBLY

CROSS-REFERENCE TO RELATED APPLICATION

None.

STATEMENT REGARDING SPONSORED RESEARCH AND/OR DEVELOPMENT

Not Applicable.

BACKGROUND OF THE INVENTION

1. Field of the Invention

The present invention generally relates to seats for motor vehicles, and more particularly, to a child seat assembly for use in motor vehicles.

2. General Background of the Invention

It has become increasingly desirable to place special seating apparatuses in motor vehicles to accommodate children. For instance, a typically rear-facing infant seat may be utilized to sufficiently restrain an infant and enable the infant to safely ride in a motor vehicle. Some of these conventional infant seats are at least generally immobilized, relative to an integrated, adult-accommodating seat of the motor vehicle, by extending a seat belt of the motor vehicle through at least a portion of the infant seat and/or by interconnecting one or more support straps of the infant seat with a frame of the motor vehicle.

Once it is determined that a child has outgrown (e.g., is too tall and/or heavy to be appropriately accommodated by) an above-mentioned infant seat, the infant seat is typically removed from the motor vehicle and replaced by a toddler seat that may be utilized to sufficiently restrain a toddler and enable the toddler to safely ride in the motor vehicle. At least generally like conventional infant seats, these conventional toddler seats are at least generally immobilized, relative to the integrated, adult-accommodating seat of the motor vehicle, by extending a seat belt of the motor vehicle through at least a portion of the toddler seat and/or by interconnecting one or more support straps of the toddler seat with the frame of the motor vehicle.

However, children also tend to outgrow these toddler seats, and it typically becomes desirable to remove the above-mentioned toddler seat from the motor vehicle and replace the same with a booster seat that may be utilized to sufficiently restrain a young child and enable the child to safely ride in the motor vehicle. These booster seats are also typically fastened into the motor vehicle using a seat belt of the motor vehicle and/or one or more support straps of the booster seat.

Regardless of the particular models utilized, the designs of these special child seating apparatuses has generally required parents/guardians of children to purchase an infant seat, a toddler seat, and a booster seat through the growth of the child. Along with the purchases of at least three different child-accommodating seats over the time the child develops/grows has typically come a significant cost to the parent/guardian.

As an alternative, some vehicle seats have been equipped with a child seat contained therein, commonly referred to as an integrated child seat. However, designs of these conventional integrated child seats have enable such integrated child seats to only be useful during a short portion of a child's life, thus still requiring the purchase of one or more of an infant seat, a toddler seat, and a booster seat. For example, a motor vehicle may include an integrated booster seat, but the integrated booster seat is generally not suitable for accommodating an infant and/or toddler. Thus, the vehicle owner may still have to purchase an infant seat and/or toddler seat to sufficiently accommodate the owner's child(ren).

SUMMARY OF THE INVENTION

Accordingly, it is an objective of the present invention to provide a vehicular seat assembly that is at least one of cost-effective and easy to use. It is another object of the invention to provide a vehicular seat assembly that can sufficiently accommodate a person during the infant stage, the toddler stage, and other stages of childhood and adulthood. Still another object of the invention is to provide a vehicular seat assembly that may be arranged in infant seat, toddler seat, and booster seat configurations. Yet another object is to provide a vehicular child seat assembly that may be at least generally stowed/hidden within a seat of a motor vehicle to enable an adult to sit on that seat of the motor vehicle. These objectives, as well as others, may be met by the present invention disclosed herein.

In a first aspect, the present invention is directed to a seat assembly for a motor vehicle. This seat assembly typically has both a seat and a backrest. The backrest of this seat assembly generally includes a first child seat portion having opposing first and second sides. The first side of the first child seat portion is pivotally interconnected with the backrest. Moreover, a second child seat portion of the backrest is pivotally interconnected with the first child seat portion near the second side of the first child seat portion.

Herein, "pivotally interconnected" or the like generally refers to any type of interconnection that allows a portion of the seat assembly to at least generally undergo a pivoting or pivotal-like motion, including without limitation any interconnection that allows a portion of the seat assembly to move at least generally about a certain axis. Representative pivotal interconnections may also include use of a flexing or elastic deformation, as well as the use of relative motion between two or more structures that are typically in interfacing relation during at least a portion of the relative movement (e.g., a hinge connection; a ball and socket connection).

Various refinements exists of the features noted in relation to the subject first aspect of the present invention. Further features may also be incorporated in the subject first aspect of the present invention as well. These refinements and additional features may exist individually or in any combination. For instance, the first child seat portion may include an infant seating surface. In other words, this first child seat portion may have a surface on which an infant's legs and/or buttocks may be disposed. Moreover, this first child seat portion may have an upholstered surface opposite the infant seating surface. So, when the first child seat portion is folded up into the backrest of the seat assembly, the upholstered surface may face a passenger in a manner that enables the passenger's back to at least generally interface with that upholstered surface. By contrast, when the first child seat portion is what may be characterized as folded out or down, the upholstered surface may generally face the seat of the seat assembly, and the infant seating surface may be exposed for supporting an infant.

Again, the second child seat portion of the backrest associated with this first aspect is pivotally interconnected with the first child seat portion near the second side of the first child seat portion. This second child seat portion may include an infant back-supporting surface. That is, the second child seat portion may be equipped with a surface against which an infant's back may be disposed. In some embodiments, the second child seat portion may have a toddler or booster seating surface opposite the infant back-supporting surface. So, when the second child seat portion is to be employed in a toddler or booster seat arrangement, the infant back-supporting surface is not utilized and may at least generally face the first child seat portion of the seat assembly. Accordingly, the toddler seating surface may be oriented in a manner that enables a toddler's legs and/or buttocks to be supported thereby. By contrast, when the second child seat portion is what may be characterized as folded out, the infant back-supporting surface of the second child seat portion may at least generally face the backrest of the seat assembly and may be employed in an infant seating arrangement of the seat assembly.

In the case of the first aspect of the present invention, the first child seat portion of the seat assembly may include a first component of an infant restraint system, and the second child seat portion may include a second component of an infant restraint system. For example, one of the first and second child seat portions may be equipped with a "female" buckle having an engagement aperture. Further, the other of the first and second child seat portions may be equipped with at least one strap or belt-type restraint that may have a "male" tongue plate that is engagable with the buckle.

The backrest associated with the seat assembly of the first aspect may include yet a third child seat portion that may be pivotally interconnected with the backrest. This third child seat portion may be characterized as a restraint device at least when it is deployed to a first position. Further, the third child seat portion may be said to make up at least a portion of a back-supporting component of the backrest when in a second position. So, for example, when the third child seat portion is in the second position, an adult's shoulders, upper back, and/or upper arms may interface with the back-supporting component. Further, when the third child seat portion is deployed into the first position, it may be characterized as a support bar that at least generally extends about a front and sides of a child. Accordingly, the child may choose to rest the child's forearms on this third child seat portion when it is in the first position.

In embodiments having the above-described third child seat portion, the backrest may include a first portion of a child restraint system. The backrest and third child seat portion thereof may be designed such that the first portion of the child restraint system is substantially hidden when the third child seat portion is disposed in the above-described second position and exposed for use when the third child seat portion is in the first position. Moreover, at least one of the first and second child seat portions may include a second portion of the child restraint system. So, for example, the first portion of the child restraint system associated with the backrest may refer to at least one strap or belt-type restraint that may have a "male" tongue plate that is engagable with a "female" buckle (the second portion of the child restraint system) that may be associated with one or both the first and second child seat portions of the seat assembly.

Still referring to the seat assembly of the first aspect, some embodiments may include what may be characterized as a supplemental backrest of sorts. In one embodiment, this supplemental backrest may be pivotally interconnected with the backrest of the seat assembly. In such an embodiment, the supplemental backrest may have a seating surface and an opposing backrest surface. Accordingly, when the supplemental backrest is in one position, it may be disposed within a first receptacle defined in the seat so that a person may sit on it. By contrast, when the supplemental backrest is in a second position, it may be disposed in a second receptacle (e.g., void from a deployment of at least the first child seat portion) defined in the backrest. Since the supplemental backrest of this embodiment may be repositioned from the first receptacle in the seat to the second receptacle in the backrest, a supplemental seating apparatus may be utilized to occlude the first receptacle in the seat when the supplemental backrest is in the second receptacle of the backrest. Thus, if it is desired to remove the infant seat arrangement from the motor vehicle (e.g., to use as an infant carrier), the supplemental backrest and supplemental seating apparatus may be employed to enable a remainder of the seat assembly to be utilized to accommodate a person.

In a different embodiment having a supplemental backrest, the supplemental backrest may be substantially housed and/or hidden within an interior portion of the backrest when not in use, for example, when the first child seat portion has not been deployed. However, under appropriate conditions, such as the first child seat portion of the seat assembly being deployed, the supplemental backrest may be exposed and moved to a peripheral portion of the backrest (e.g., to at least generally fill a void left from deployment of the first child seat portion). As with the embodiment described above, if it is desired to remove the infant seat arrangement from the motor vehicle (e.g., to use as an infant carrier), this supplemental backrest may be employed to enable a remainder of the seat assembly to be utilized to accommodate a person.

A second aspect of the present invention is embodied in a seat assembly for a motor vehicle. This seat assembly may be positioned in an infant seat arrangement to accommodate an infant, a toddler seat arrangement to accommodate a toddler, a booster seat arrangement to accommodate a child, and an adult seat arrangement to accommodate an adult. Moreover, these arrangements of the seat assembly of this second aspect are generally achievable without addition or removal of components from the motor vehicle.

Various refinements exists of the features noted in relation to the subject second aspect of the present invention. Further features may also be incorporated in the second aspect of the present invention as well. These refinements and additional features may exist individually or in any combination. For instance, to achieve the infant seat arrangement of the seat assembly, the seat assembly may be equipped with one or more pivoting mechanisms. As an example, in one embodiment, the seat assembly may include a pivoting mechanism to enable an infant seating portion of the seat assembly to be pivoted relative to a backrest of the seat assembly with which the infant seating portion is interconnected. Further, the seat assembly of such an embodiment may include another pivoting mechanism to enable an infant backrest portion of the seat assembly to be pivoted relative to the infant seating portion with which the infant backrest portion is interconnected.

Still referring to the second aspect of the present invention, to achieve the toddler seat arrangement of the seat assembly, the seat assembly may include one or more pivoting mechanisms. For instance, the seat assembly may include a pivoting mechanism to enable a toddler seating portion of the seat assembly to be pivoted relative to a backrest of the seat assembly with which the toddler seating portion is interconnected. Moreover, the seat assembly may include another pivoting mechanism to enable a toddler restraint to be pivoted relative to the backrest of the seat assembly. This toddler seat arrangement may further include a mechanism to enable a stowable supplemental backrest portion of the seat assembly to be exposed.

Yet still with regard to the second aspect, to achieve the booster seat arrangement of the seat assembly, the seat assembly may include one or more pivoting mechanisms. In one embodiment, the seat assembly may include a pivoting mechanism to enable a booster seating portion of the seat assembly to be pivoted relative to a backrest of the seat assembly with which the booster seating portion is interconnected. As with the toddler seat arrangement, this booster seat arrangement may also include a mechanism for exposing a stowable supplemental backrest portion of the seat assembly.

Generally, each of the various features discussed herein in relation to one or more of the described aspects of the present invention may be utilized by any other aspect(s) of the present invention as well, alone or in any combination.

BRIEF DESCRIPTION OF THE DRAWINGS

FIG. 6A is a side view of the seat assembly of FIGS. 1–4 configured in a toddler seat arrangement.

FIG. 6B is a side view of the seat assembly of FIG. 6A being rearranged from the toddler seat arrangement to the infant seat arrangement.

DETAILED DESCRIPTION OF THE DRAWINGS

Figure 1:
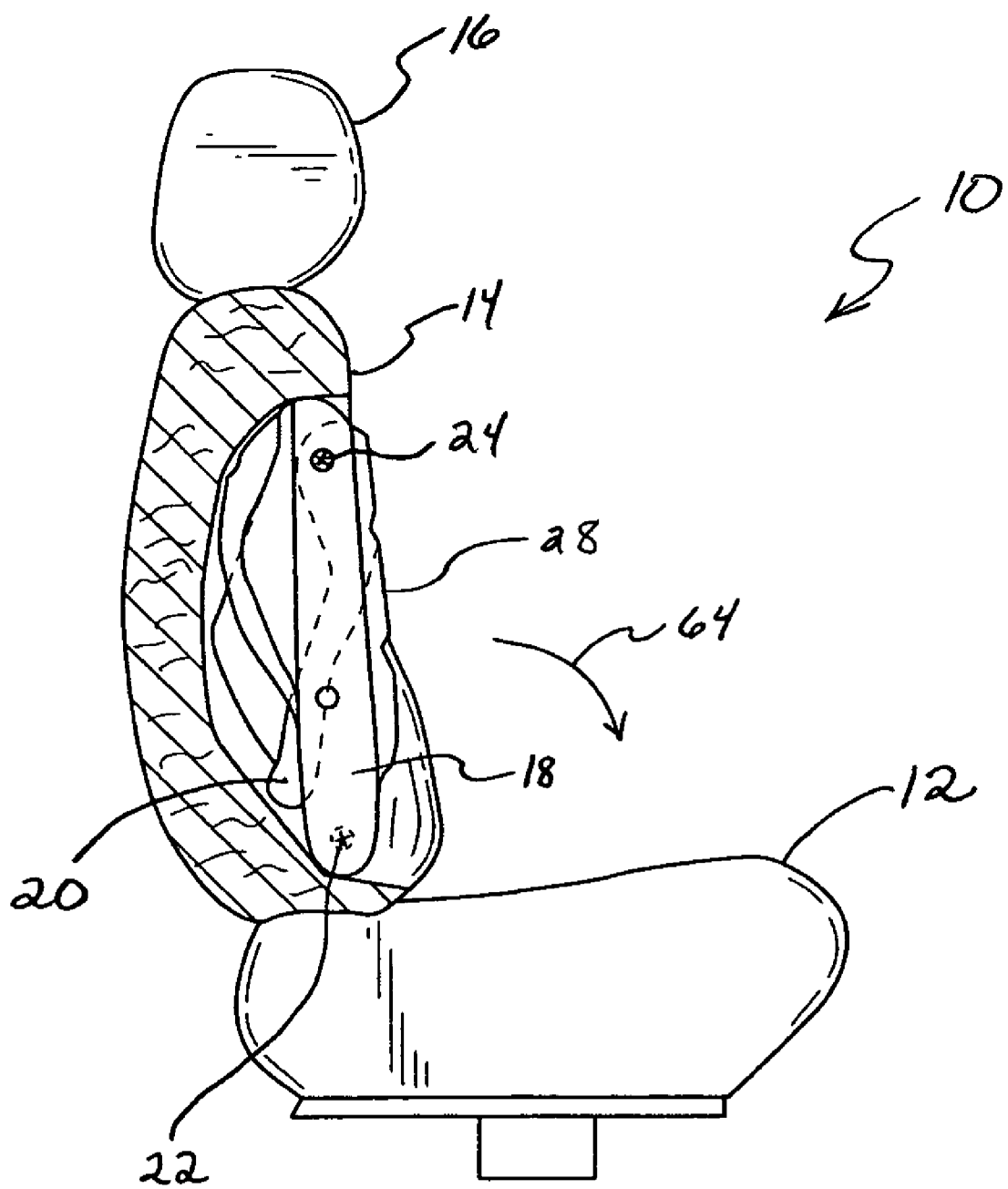
FIG. 1 is a side view of a seat assembly of a motor vehicle.

The present invention will now be described in relation to the accompanying drawings, which at least assist in illustrating the various pertinent features thereof. Incidentally, it should be noted that various features of the illustrated embodiments have been omitted from some of the views of the present invention to more clearly illustrate and describe other features of the invention.

FIGS. 1–4 illustrate a seat assembly 10 that includes a seat 12, a backrest 14, and a headrest 16. The backrest 14 of the seat assembly 10 is shown as being equipped with first and second child seat portions 18, 20 (respectively). More particularly, a first side 22 of the first child seat portion 18 is pivotally interconnected with the backrest 14. Further, the second child seat portion 20 is pivotally interconnected with the first child seat portion 18 near a second side 24 of the first child seat portion 18 that is at least generally opposite the first side 22. Again, "pivotally interconnected" or the like generally refers to any type of interconnection that allows a portion of the seat assembly to at least generally undergo a pivoting or pivotal-like motion, including without limitation any interconnection that allows a portion of the seat assembly to move at least generally about a certain axis. Accordingly, the first child seat portion 18 is interconnected with the backrest 14 in a manner that enables the first child seat portion to rotate or pivot about a first axis 22 of the seat assembly 10. Herein, "interconnected" or the like generally refers to something being either directly or indirectly connected (or caused to be connected) with something else. It should be noted any of a number of appropriate mechanisms may be employed to enable this first child seat portion 18 to rotate/pivot about the first axis 22. Further, the second child seat portion 20 of the seat assembly 10 is interconnected with the first child seat portion 18 in a manner that enables the second child seat portion 20 to rotate or pivot about a second axis 24 of the seat assembly 10. It should also be noted any of a number of appropriate mechanisms may be employed to enable this second child seat portion 20 to rotate/pivot about the second axis 24.

Figure 2:
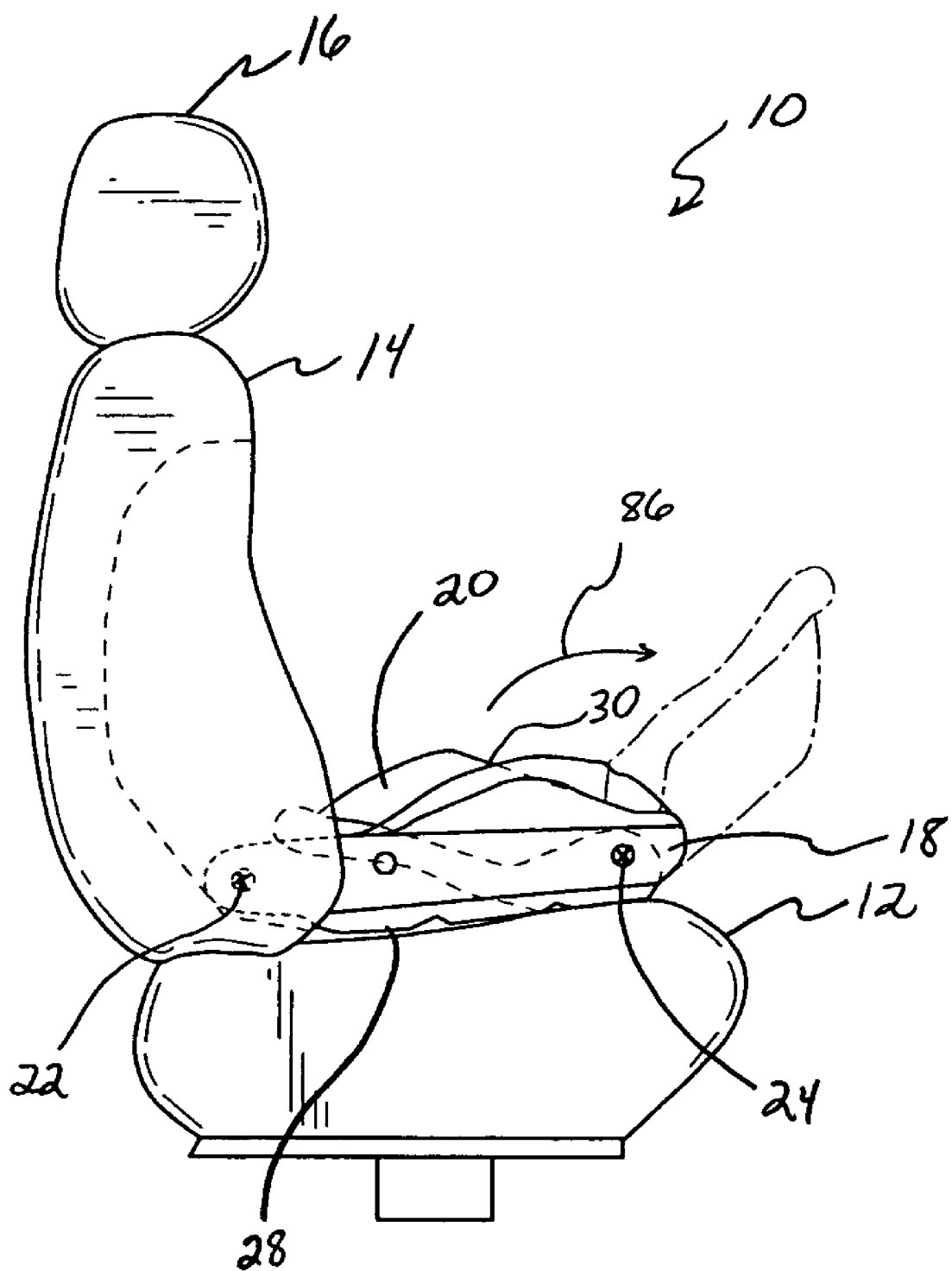
FIG. 2 is a side view of the seat assembly of FIG. 1 configured in a booster seat arrangement.
Figure 3:
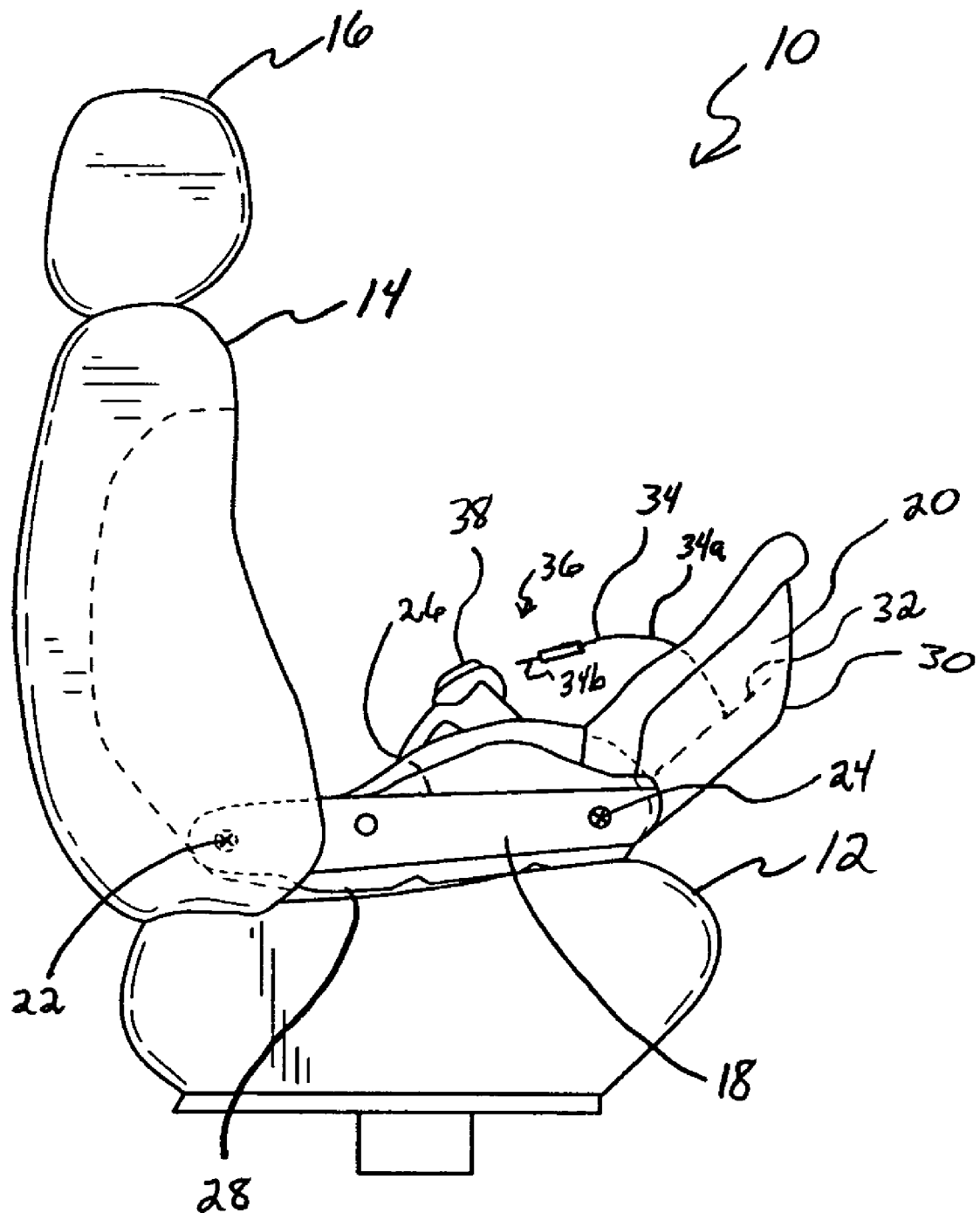
FIG. 3 is a side view of the seat assembly of FIGS. 1–2 configured in an infant seat arrangement.

Still referring to FIGS. 1–4, the first child seat portion 18 of the seat assembly 10 includes an infant seating area 26 on which an infant's legs and/or buttocks may be disposed when the seat assembly 10 is configured in an infant seat arrangement as shown in FIG. 3. Moreover, this first child seat portion 18 has an upholstered surface 28 opposite the infant seating area 26. So, when the first child seat portion 18 is folded up into the backrest 14 of the seat assembly 10, the upholstered surface 28 is oriented to at least generally face a passenger in a manner that enables the passenger's back to at least generally interface with the upholstered surface 28 when seated on the seat assembly 10. By contrast, when the first child seat portion 18 is folded out or down, as shown in FIGS. 2–3, the upholstered surface 28 at least generally faces the seat 14 of the seat assembly 10, and a child seating area 30 or the infant seating area 26 may be exposed in a manner to enable a child or infant (respectively) to be at least generally supported thereby.

Figure 4:
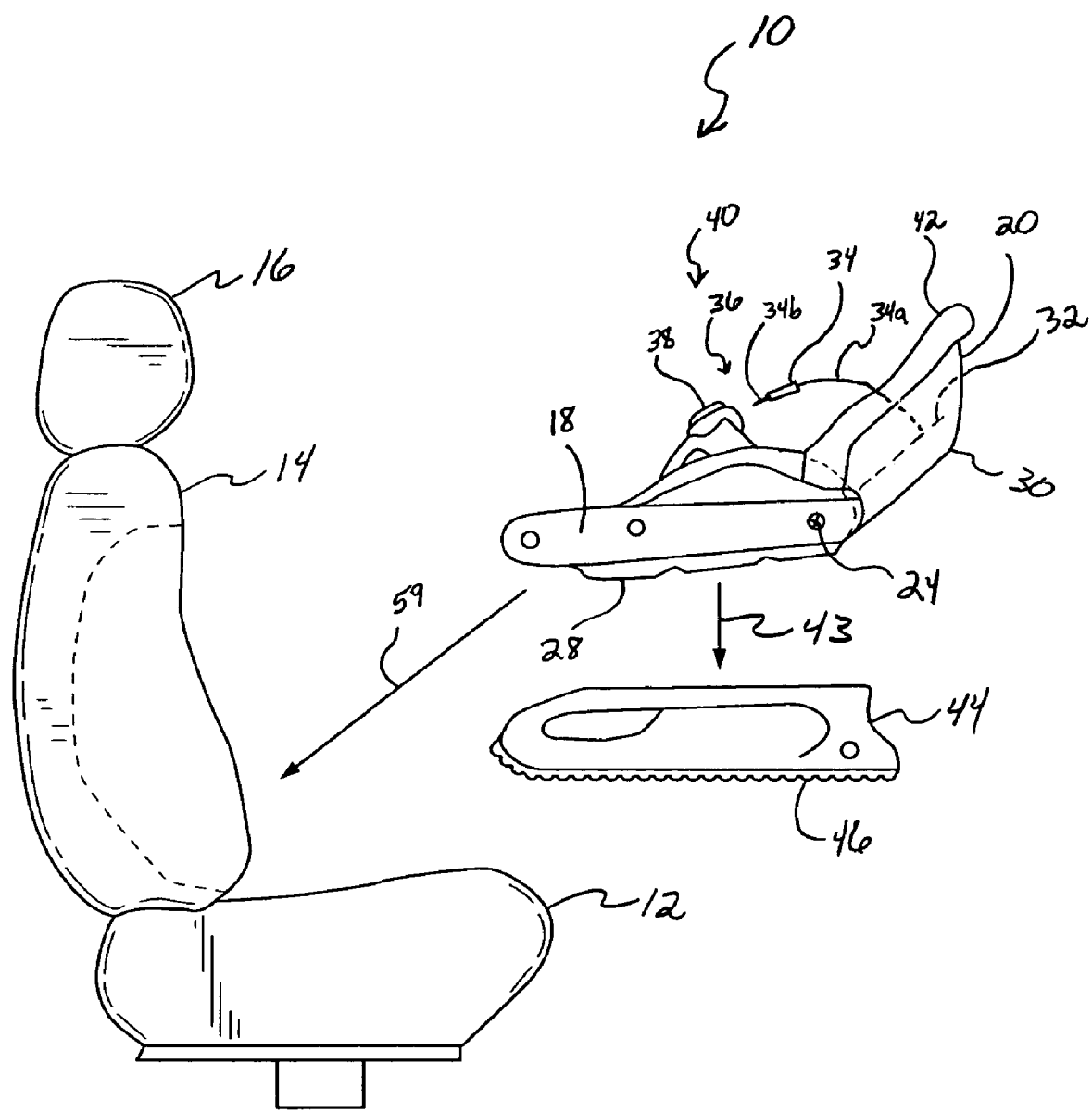
FIG. 4 is a side view of the seat assembly of FIGS. 1–3 showing an infant carrier feature of the seat assembly.

FIGS. 3–4 illustrate that the second child seat portion 20 of the seat assembly 10 includes an infant back-supporting area 32 at least generally against which an infant's back may be disposed when an infant is appropriately placed in the infant seat arrangement of the seat assembly 10. This second child seat portion 20 of the seat assembly 10 has the child seating area 30 disposed opposite the infant back-supporting area 32. So, when the second child seat portion 20 is to be employed in a toddler seat arrangement (FIGS. 6A and 6C) and/or a booster seat arrangement (FIGS. 2, 5B, 5D), the infant back-supporting area 32 at least generally faces the first child seat portion 18 of the seat assembly 10. Moreover, the child seating area 30 in these toddler and booster seat arrangements is oriented in a manner that enables at least portions of a child's legs and/or buttocks to be supported thereby. By contrast, when the second child seat portion 20 is folded out, as shown in FIGS. 3, 4, 6B, and 6D, the infant back-supporting area 32 of the second child seat portion 20 at least generally faces the backrest 14 of the seat assembly 10 and may be employed in an infant seat arrangement of the seat assembly 10.

Still referring to FIGS. 3–4, the second child seat portion 20 of the seat assembly 10 includes a first component 34 of an infant restraint system 36 shown here as a belt restraint 34a having an associated tongue plate 34b. Further, the first child seat portion 18 includes a second component 38 of an infant restraint system 36 shown here as a "female" buckle configured to receive and releasably engage the tongue plate 34b of the first component 34 of the infant restraint system 36. While FIGS. 3–4 illustrate one restraint system 36 that may be utilized in the seat assembly 10, it should be noted that any of a number of other appropriate restraint systems may be employed in other embodiments of the seat assembly 10.

FIG. 4 illustrates that one embodiment of the seat assembly 10 is designed to enable a portion of the seat assembly 10 to be dissociated from a remainder of the seat assembly 10 and utilized as an infant carrier 40. Any of a number of appropriate designs for releasable interconnections that enable the infant carrier 40 to be detached and reattached to the backrest 14 of the seat assembly 10 may be employed in the seat assembly 10. In any event, this infant carrier 40 shown in FIG. 4 is equipped with a handle 42 that may be rotated about the reference axis 24 to any desired position to facilitate carrying of the carrier 40 by a person. While FIG. 4 illustrates one embodiment of the carrier 40 and associated handle 42, it should be noted that any of a number of other appropriate designs of the carrier 40 and/or handle 42 may be employed in the seat assembly 10. For instance, the second portion 20 of the seat assembly 10 may include a cup and/or bottle holder (e.g., a collapsible or foldable cut/bottle holder).

In addition to the handle 42, the seat assembly 10 may include a base 44 that is interconnectable with the carrier 40 as indicated by arrow 43. This base 44 is shown as having a rubber bottom portion 46 to promote traction or gripping of the carrier 40 with a supporting surface (e.g., the ground). It should be noted that the base 44 may be of any appropriate design and may be releasably interconnected with the carrier 40 in any appropriate fashion. A benefit of employing this base 44 is that it provides a clearance between a supporting surface (e.g., the ground) on which the carrier 40 is disposed and the upholstered surface 28 of the first child seat portion 18 of the seat assembly 10. Accordingly, use of this base 44 at least generally prevents undesired wear and/or damage to the upholstered surface 28 during use of the carrier 40.

Figure 5A:
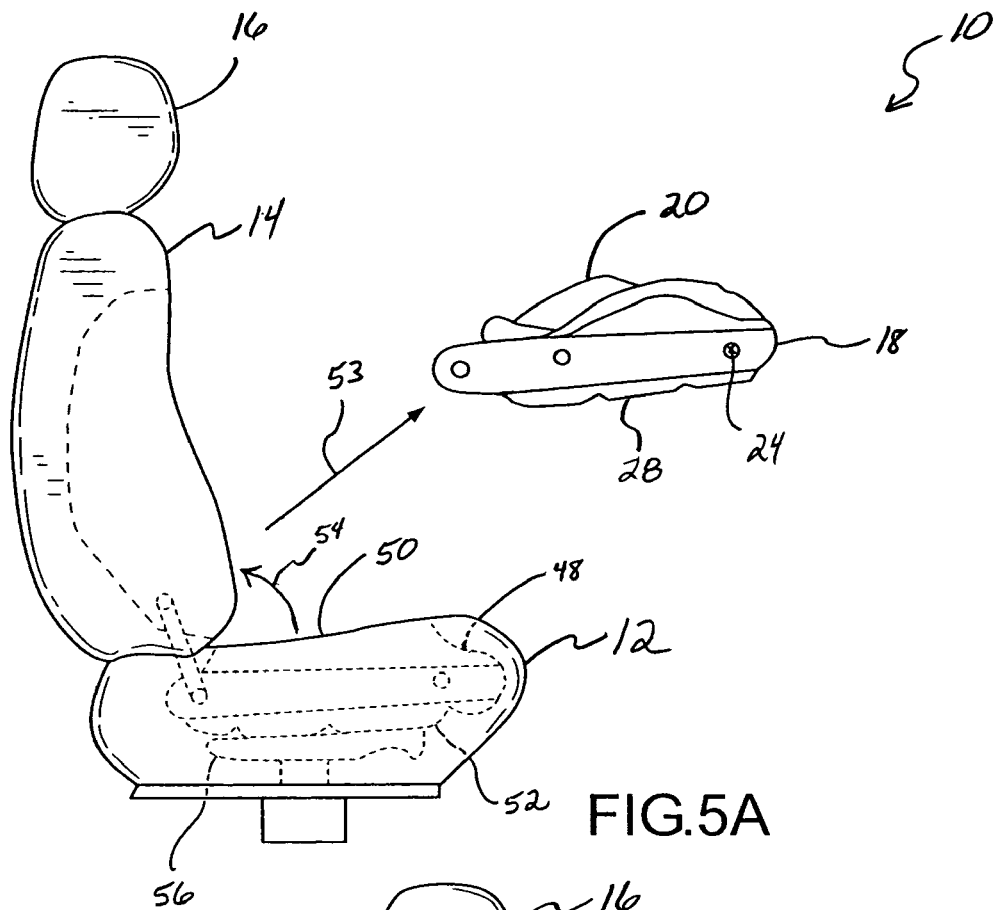
FIGS. 5A–B are side views of the seat assembly of FIG. 2 showing one design of a supplemental backrest feature of the seat assembly.
Figure 5B:
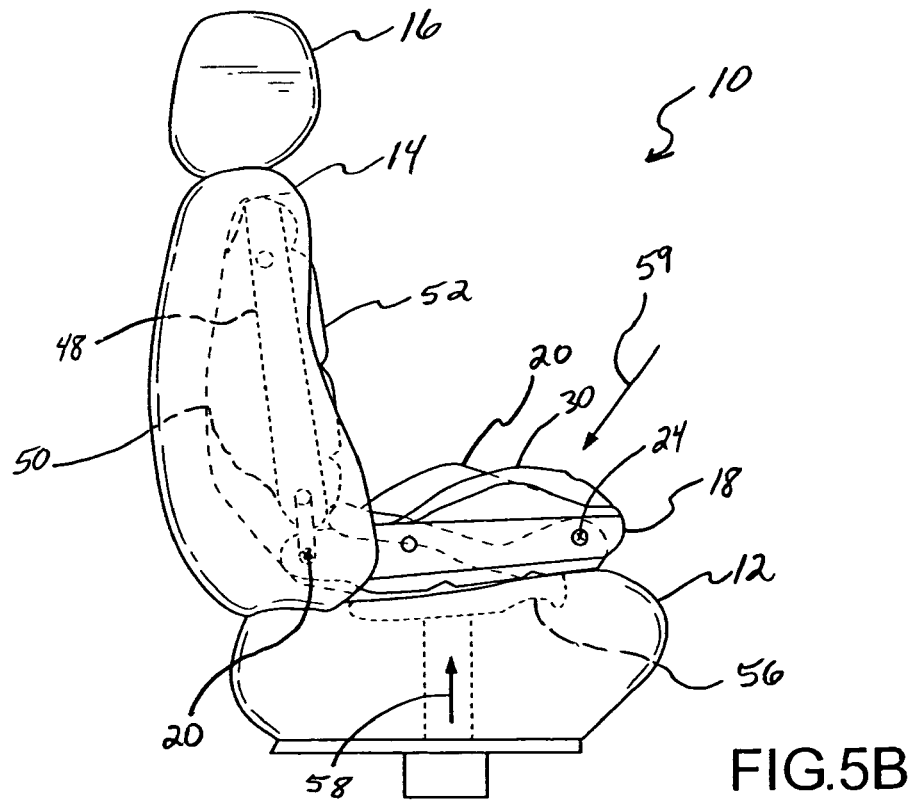

FIGS. 5A–B illustrate one design of a supplemental backrest 48 that may be employed in the seat assembly 10. Here, this supplemental backrest 48 is at least generally pivotally interconnected with the backrest 14 of the seat assembly 10. Moreover, the supplemental backrest 48 includes a seating surface 50 on one side and a backrest surface 52 on an opposing side. Accordingly, when the supplemental backrest 48 is in the position shown in FIG. 5A, it is disposed within a first receptacle defined in the seat 14 so that a person may sit on the seating surface 50 of the supplemental backrest 48. By contrast, when the supplemental backrest 48 is in the position shown in FIG. 5B, the supplemental backrest 48 is disposed in a second receptacle (e.g., void from a deployment and/or detachment of at least the first child seat portion 18) defined in the backrest 14. Further, the seat assembly 10 is equipped with a supplemental seating apparatus 56. The backrest surface 52 of the supplemental backrest 48 is positioned at least generally between the seating surface 50 of the supplemental backrest 48 and this supplemental seating apparatus 56 when the supplemental backrest 48 is in the position shown in FIG. 5A.

Figure 6C:
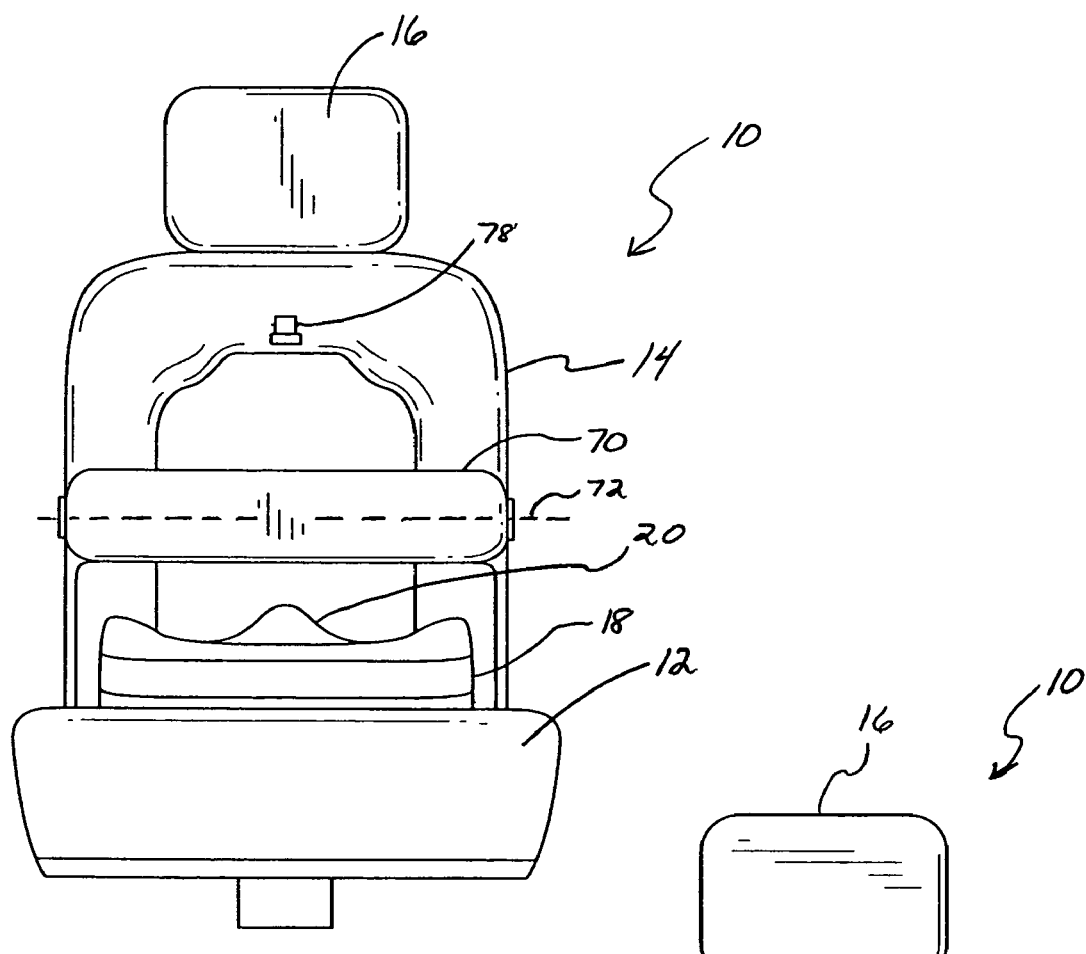
FIG. 6C is a front view of the seat assembly of FIG. 6A in the toddler seat arrangement.

To utilize this supplemental backrest 48 and supplemental seat apparatus 56 of the seat assembly 10 of FIGS. 5A–5B, the first child seat portion 18 is at least temporarily detached from the backrest 14 as indicated by arrow 53, and the supplemental backrest 48 may be moved in the general direction indicated by arrow 54 to change its position from that shown in FIG. 5A to that shown in FIG. 5B. This movement of the supplemental backrest 48 in the direction 54 may be accomplished in any appropriate manner including, but not limited to, manually, electronically, hydraulically, and pneumatically, as well as appropriate combinations thereof. In addition, the above-described movement of this supplemental backrest 48 allows the supplemental seating apparatus 56 to be moved in the direction indicated by arrow 58 from its position shown in FIG. 5A to its position shown in FIG. 5B to at least generally fill the void left by the moving of the supplemental backrest 48. As with the supplemental backrest 48, movement of this supplemental seating apparatus 56 in the direction 58 may be accomplished in any appropriate manner including, but not limited to, manually, electronically, hydraulically, and pneumatically, as well as appropriate combinations thereof. Subsequently, the first child seat portion 18 of the seat assembly 10 may be reattached to the backrest 14 (as indicated by arrow 59 of FIG. 5B) if it is desired to utilized the seat assembly 10 in a booster seat arrangement (FIG. 5B) and/or a toddler seat arrangement (FIGS. 6A and 6C). Alternatively, if it is desired to utilize the first and second child seat portions 18, 20 in their capacity as an infant carrier 40 (FIG. 4), employment of the supplemental backrest 48 & supplemental seating apparatus 56 beneficially enables the remainder of the seat assembly 10 to still be utilized to sufficiently accommodate a person.

To change the configuration of the seat assembly 10 from that shown in FIG. 5B back to that shown in FIG. 5A, at least the first child seat portion 18 of the seat assembly 10 may be temporarily detached from the backrest 14 (if the first child seat portion is attached thereto). Further, the supplemental seating apparatus 56 may be moved in a direction substantially opposite that shown by arrow 58, and the supplemental backrest 48 may be moved in a direction substantially opposite that shown by arrow 54. Then, at least the first child seat portion 18 of the seat assembly 10 may be reconnected with the backrest 14.

Figure 5C:
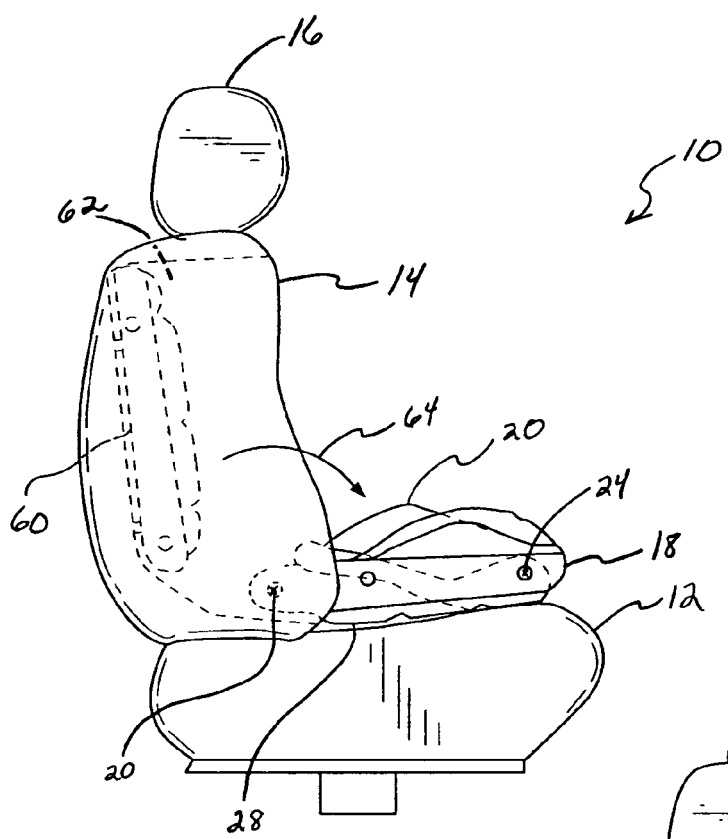
FIGS. 5C–D are side views of the seat assembly of FIG. 2 showing another design of a supplemental backrest feature of the seat assembly.
Figure 5D:
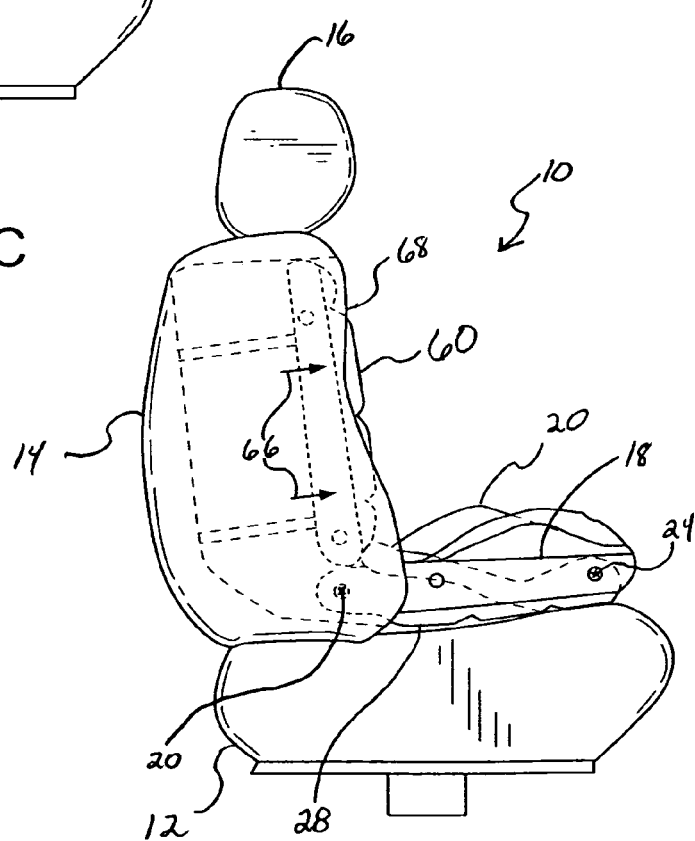

FIGS. 5C and 5D illustrate another design of a supplemental backrest 60 that may be employed in the seat assembly 10. As shown in FIG. 5C, this supplemental backrest 60 may be housed and/or substantially hidden within an interior portion 62 of the backrest 14 when not in use, for example, when the first child seat portion 18 has not been deployed in the direction indicated by arrow 64. However, under appropriate conditions, such as the first child seat portion 18 of the seat assembly 10 being deployed in the direction 64, as shown in FIG. 5C, the supplemental backrest 60 may be moved in the direction indicated by arrows 66 (FIG. 5D) to a peripheral portion 68 of the backrest 14 (e.g., to at least generally fill the void left from deployment of the first child seat portion 18). To change the configuration of the seat assembly 10 from that shown in FIG. 5D back to that shown in FIG. 5C, the supplemental backrest 60 may be moved in a direction substantially opposite that shown by arrows 66. Movement of the supplemental backrest 60 in the direction 66 and/or a direction substantially opposite to direction 66 may be accomplished in any appropriate manner including, but not limited to, manually, electronically, hydraulically, and pneumatically, as well as appropriate combinations thereof. As a benefit of this design shown in FIGS. 5C–5D, if it is desired to at least temporarily detach the first and second child seat portions 18, 20 from the backrest 14 (as in the case of employing the same as an infant carrier 40), inclusion of this supplemental backrest 60 in the seat assembly 10 enables a remainder of the seat assembly 10 to be utilized to accommodate a person. While FIGS. 5A–D illustrate two appropriate designs of supplemental backrests 48, 60, it should be noted that other embodiments of the seat assembly 10 may include other appropriate designs of a supplemental backrest.

Referring to FIGS. 6A–D, the backrest 14 of the seat assembly 10 is equipped with a third child seat portion 70 that is pivotally interconnected with the backrest 14 in a manner that enables the third child seat portion 70 to pivot/rotate about axis 72. This third child seat portion 70 may be characterized as a restraint device at least when it is in the position illustrated in FIGS. 6A and 6C (e.g., a toddler seat arrangement). Moreover, the third child seat portion 70 includes a back-supporting surface 74 that may at least generally interface with a person's back when a person is sitting on the seat assembly 10 and when the third child seat portion 70 is in the position illustrated in FIGS. 6B and 6D. Accordingly, when the third child seat portion 70 is in the position shown in FIGS. 6B and 6D and the first and second child seat portions 18, 20 (respectively) are in the position shown in FIG. 1, an adult's shoulders, upper back, and/or upper arms may interface with the back-supporting surface 74 of the third child seat portion 70. Further, when the third child seat portion 70 is moved into the position shown in FIGS. 6A and 6C, it may be characterized as a support bar that at least generally extends about a front and sides of a child. Accordingly, the child may choose to rest the child's forearms on this third child seat portion 70 when it is in this position. In some embodiments, the head rest 16 may also be movable along with the third child seat portion 70. In such embodiments, it may be desirable for the head rest 16 to be adjustable one or both of toward and away from the backrest 14 when the third child seat portion 70 (and thus the headrest 16) is disposed in the position illustrated in FIGS. 6A and 6C.

Still referring to FIGS. 6A and 6B, the third child seat portion 70 of the seat assembly 10 may include one or more receptacles 76. The receptacle(s) 76 may be disposed in any appropriate location(s) and exhibit any desired design(s), dimensions, and/or configuration(s). For instance, the receptacle 76 illustrated in FIGS. 6A–6B is designed as a cup and/or bottle holder.

FIGS. 6A–6C also illustrate that the backrest 14 of the seat assembly 10 includes a first portion 78 of a child restraint system 80. More particularly, this first portion 78 of the child restraint system 80 is shown as a belt restraint 78a having an associated tongue plate 78b. Further, the second child seat portion 20 of the seat assembly 10 includes a second portion 82 of the infant restraint system 80 shown here as a "female" buckle configured to receive and releasably engage the tongue plate 78b of the first portion 78 of the child restraint system 80. The backrest 14 and third child seat portion 70 thereof are preferably designed such that the first portion 78 of the child restraint system 80 is substantially hidden when the third child seat portion 70 is disposed in the position illustrated in FIGS. 6B and 6D and such that the first portion 78 is exposed for use when the third child seat portion 70 is in the position illustrated in FIGS. 6A and 6C. While FIG. 6A illustrates one child restraint system 80 that may be utilized in the seat assembly 10, it should be noted that any of a number of other appropriate child restraint systems may be employed in other embodiments of the seat assembly 10.

Utilizing the above-described seat assembly 10, various seating arrangements may be achieved. For instance, to change the configuration of the adult seat arrangement of the seating assembly 10 shown in FIG. 1 to the infant seat arrangement of the seat assembly 10 shown in FIGS. 3, 6B, and 6D, the first child seat portion 18 of the seat assembly 10 may be moved in the direction 64 (FIG. 1) at least generally about the axis 22 from the position shown in FIG. 1 to the position shown in FIG. 2. Then, the second child seat portion 20 of the seat assembly 10 may be moved at least generally in the direction indicated by arrow 86 (FIG. 2) from the position shown in FIG. 2 to the position shown in FIG. 3 to achieve the infant seat arrangement of the seat assembly 10 illustrated in FIG. 3. To change the configuration of the infant seat arrangement of the seat assembly 10 shown in FIG. 3 back to the adult seat arrangement of the seat assembly 10 shown in FIG. 1, the second child seat portion 20 may be moved in a direction substantially opposite to the direction 86 to the position shown in FIG. 2, and the first child seat portion 18 may be moved in a direction substantially opposite to the direction 64 to the position shown in FIG. 1.

In one manner of changing the configuration of the adult seat arrangement of the seat assembly 10 shown in FIG. 1 to the toddler seat arrangement of the seat assembly 10 shown in FIGS. 6A and 6C, the first child seat portion 18 of the seat assembly 10 may be moved in the direction 64 (FIG. 1) at least generally about the axis 22 to the position shown in FIGS. 2 and 5C. The supplemental backrest 60 may be moved in the direction 66 from the position shown in FIG. 5C to the position shown in FIG. 5D. In addition, the third child seat portion 70 of the seat assembly 10 may be moved at least generally in the direction indicated by arrow 88 (FIG. 6A) to achieve the toddler seat arrangement of the seat assembly 10 illustrated in FIGS. 6A and 6C.

Figure 6D:
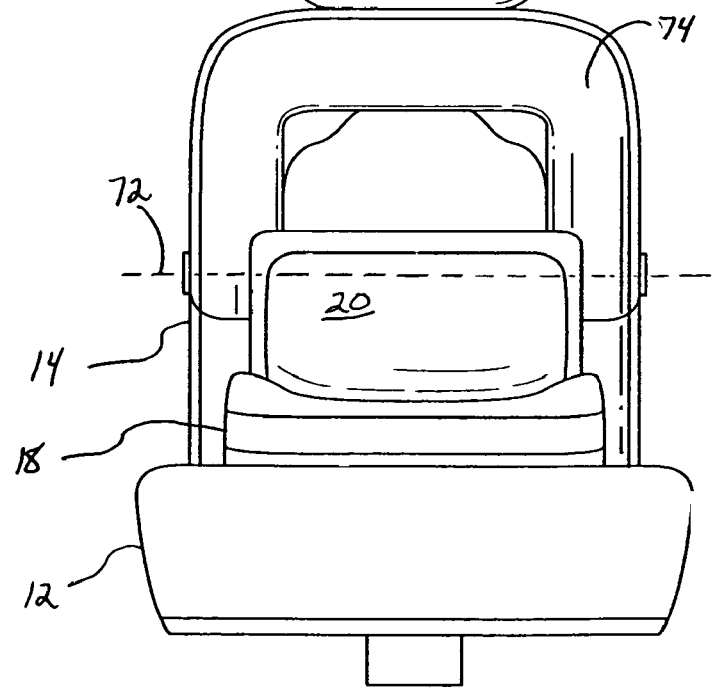
FIG. 6D is a front view of the seat assembly of FIG. 6B in the infant seat arrangement.

To change the above-described configuration of the toddler seat arrangement of the seat assembly 10 (FIGS. 6A–6C) that employs the supplemental backrest 70 of FIGS. 5C–5D back to the adult seat arrangement shown in FIG. 1, the third child seat portion 70 may be moved in a direction (indicated by arrow 90 of FIG. 6B) substantially opposite the direction 88 to the position shown in FIGS. 6B and 6D. In addition, the supplemental backrest 70 may be moved in a direction substantially opposite that of the direction 66, and the first child seat portion 18 may be moved in a direction substantially opposite to the direction 64 to the position shown in FIG. 1.

In another manner of changing the configuration of the adult seat arrangement shown in FIG. 1 to the toddler seat arrangement of the seat assembly 10 shown in FIGS. 6A and 6C, the first and second child seat portions 18, 20 of the seat assembly 10 may be temporarily detached from the backrest 14 as indicated by the arrow 53 of FIG. 5A. The supplemental backrest 48 may be moved in the direction 54 (FIG. 5A) from the position shown in FIG. 5A to the position shown in FIG. 5B. Further, the supplemental seat apparatus 56 may be moved in the direction 58 (FIG. 5B) from the position shown in FIG. 5A to the position shown in FIG. 5B, and the first child seat portion of the seat assembly 10 may be reattached to the backrest 14 as indicated by the arrow 59 of FIG. 5B. In addition, the third child seat portion 70 of the seat assembly 10 may be moved at least generally in the direction indicated by arrow 88 (FIG. 6A) to achieve the toddler seat arrangement of the seat assembly 10 illustrated in FIGS. 6A and 6C.

To change this configuration of the toddler seat arrangement of the seat assembly 10 (FIGS. 6A and 6C), employing the supplemental backrest 48 and the supplemental seat apparatus 56, back to the adult seat arrangement shown in FIG. 1, the third child seat portion 70 may be moved in a direction (indicated by arrow 90 of FIG. 6B) substantially opposite the direction 88 to the position shown in FIGS. 6B and 6D. In addition, the first child seat portion 18 of the seat assembly 10 may be temporarily detached from the backrest 14. Further, the supplemental backrest 48 may be moved in a direction substantially opposite that of the direction 54 to the position shown in FIG. 5A, and the supplemental seat apparatus 56 may be moved in a direction substantially opposite that of direction 58 to the position shown in FIG. 5A. Yet further, the first child seat portion 18 may be reattached to the backrest 14 and moved in a direction substantially opposite to the direction 64 to the position shown in FIG. 1.

The adult seat arrangement of the seat assembly 10 shown in FIG. 1 can also be changed to the booster seat arrangement of the seat assembly 10 shown in FIG. 5D. This may be done by moving the first child seat portion 18 of the seat assembly 10 in the direction 64 (FIGS. 1 and 5C) at least generally about the axis 22 from the position shown in FIG. 1 to the position shown in FIGS. 5C–5D. In addition, the supplemental backrest 60 may be moved in the direction 66 from the position shown in FIG. 5C to the position shown in FIG. 5D.

The above-described configuration of the booster seat arrangement of the seat assembly 10 shown in FIG. 5D may also be changed back to the adult seat arrangement of the seat assembly 10 shown in FIG. 1. This may be accomplished by moving the supplemental backrest 70 in a direction substantially opposite that of the direction 66 from the position shown in FIG. 5D to the position shown in FIG. 5C, and moving the first child seat portion 18 in a direction substantially opposite to the direction 64 from the position shown in FIG. 5C to the position shown in FIG. 1.

In a manner of changing the configuration of the adult seat arrangement of the seat assembly 10 shown in FIG. 1 to the booster seat arrangement of the seat assembly 10 shown in FIG. 5B, the first child seat portion 18 of the seat assembly 10 may be temporarily detached from the backrest 14 as indicated by the arrow 53 of FIG. 5A. The supplemental backrest 48 may be moved in the direction 54 (FIG. 5A) from the position shown in FIG. 5A to the position shown in FIG. 5B. Further, the supplemental seat apparatus 56 may be moved in the direction 58 (FIG. 5B) from the position shown in FIG. 5A to the position shown in FIG. 5B. Yet further, the first child seat portion of the seat assembly 10 may then be reattached to the backrest 14 as indicated by the arrow 59 of FIG. 5B.

The above-described configuration of the booster seat arrangement of the seat assembly 10 shown in FIG. 5B may also be changed back to the adult seat arrangement of the seat assembly 10 shown in FIG. 1. To do this, the first child seat portion 18 of the seat assembly 10 may be temporarily detached from the backrest 14. The supplemental backrest 48 may be moved in a direction substantially opposite that of the direction 54 from the position shown in FIG. 5B to the position shown in FIG. 5A, and the supplemental seat apparatus 56 may be moved in a direction substantially opposite that of direction 58 from the position shown in FIG. 5B to the position shown in FIG. 5A. Then, the first child seat portion 18 may be reattached to the backrest 14 and moved in a direction substantially opposite to the direction 64 to the position shown in FIG. 1.

Those skilled in the art will now see that certain modifications can be made to the assembly and related methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims. For instance, while the invention is described in regard to its application in motor vehicles (e.g., cars, SUVs, trucks, and the like), the invention may also have application in aircrafts, marine vessels, and/or any other application in which a multi-configurable seat assembly would be desirable.

What is claimed is:

1. A seat assembly for a motor vehicle, comprising:

a seat, a first child seat portion, a second child seat portion, an infant restraint system, and a backrest, wherein said backrest includes a vertically oriented receptacle disposed centrally in said backrest sized to receive said infant restraint system, said first child seat portion, and said second child seat portion;

said first child seat portion comprising opposing first and second sides, wherein said first side is pivotally interconnected at a first axis of said backrest so as to swing from a closed position when retained within the receptacle of said backrest, and an open position when pivoted out of the receptacle to a position at rest on said seat, and a first component of said infant restraint system;

said second child seat portion being pivotally interconnected to said second side of said first child seat portion so as to selectively swing about a second axis of said second side of said first child seat portion from a closed position wherein said second child seat portion is adjacent to said first child seat portion to an open position extending from said second side of said first child seat portion when said first child seat portion is pivoted to rest on said seat; and said second child seat portion comprising a second component of said infant restraint system wherein said first and second components of said infant restraint system are encapsulated by said first child seat portion and said second child seat portion when said second child seat portion is in its closed position;

whereby, said seat assembly may be selectively used for seating an adult when the first and second child seat portions are contained within the receptacle, a toddler when the first child seat portion is pivoted to rest on the seat and the second child seat portion remains in a closed position adjacent the first child seat portion, and an infant when the second child seat portion is pivoted about the second axis to the open position.

2. A seat assembly, as claimed in claim 1, wherein:

said first child seat portion includes first and second opposed seating surfaces, said first seating surface disposed adjacent the receptacle, and said second seating surface being exposed as a backrest when the first child seat portion is retained within the receptacle.

3. A seat assembly, as claimed in claim 2, wherein:

said first child seat portion includes an upholstered surface on said second seating surface.

4. A seat assembly, as claimed in claim 1, wherein:

said second child seat portion includes first and second opposing seating surfaces, the first surface forming an infant back-supporting surface when said second child seat portion is selectively disposed in the open position about the second axis.

5. A seat assembly, as claimed in claim 4, wherein:

said second child seat portion second seating surface includes a child seating surface opposite said infant back-supporting surface.

6. A seat assembly, as claimed in claim 1, further comprising:

a supplemental backrest pivotally interconnected with said backrest, wherein said supplemental backrest comprises a seating surface and an opposing backrest surface.

7. A seat assembly, as claimed in claim 6, wherein:
said supplemental backrest is disposed within a first receptacle defined in said seat when in a first position, and wherein said supplemental backrest is disposed in a second receptacle defined in said backrest when in a second position.

8. A seat assembly, as claimed in claim 7, wherein:
said seat comprises a supplemental seating apparatus, wherein said backrest surface of said supplemental backrest is disposed between said seating surface of said supplemental backrest and said supplemental seating apparatus when said supplemental backrest is in said first position.

9. A seat assembly, as claimed in claim 1, further comprising:
a supplemental backrest, wherein said supplemental backrest is substantially housed within an interior portion of said backrest when in a first position, and wherein said supplemental backrest is disposed at a peripheral portion of said backrest when in a second position.

10. A seat assembly, as claimed in claim 1, wherein:
said backrest comprises a third child seat portion pivotally interconnected with said backrest, wherein said third child seat portion comprises a restraint device when in a first position, and wherein said third child seat portion comprises a back-supporting component of said backrest when in a second position.

* * * * *